Figure 1:

J. A. BIDWELL & W. CHISHOLM.
Wood-Screws.

No. 134,783. Patented Jan. 14, 1873.

UNITED STATES PATENT OFFICE.

JASON A. BIDWELL AND WILLIAM CHISHOLM, OF CLEVELAND, OHIO.

IMPROVEMENT IN WOOD-SCREWS.

Specification forming part of Letters Patent No. 134,783, dated January 14, 1873.

*To all whom it may concern:*

Be it known that we, JASON A. BIDWELL and WILLIAM CHISHOLM, of Cleveland, county of Cuyahoga and State of Ohio, have invented a new and Improved Wood-Screw made of Bessemer or homogeneous steel wire.

We are aware that watch, machine, and other screws have heretofore been made of ordinary heterogeneous steel and of cast-steel, and used, which we do not claim *per se*. We are also aware that it has been attempted to make wood-screws of the same materials, but without success, as the unequal hardness and lumpiness of the metal would cause the threading and other tools of the screw-machine to break and the screw to be unsymmetrical. To avoid this unevenness of the screw high cast-steel was used, but it was found to be too hard and refractory, as well as too costly, to be practically available; yet, notwithstanding the formidable nature of these obstacles, much time was expended and many experiments were made to overcome them, as a wood gimlet-pointed screw of stronger and more enduring material than iron wire had become a great desideratum, if not an indispensable necessity, in important branches of the arts and manufactures, and, among other things, in the construction of railway cars, in which the safety and even lives of passengers often depend upon the integrity of a wood-screw, which, under tension, is extremely liable to break near the point at which the thread terminates at the upper part of the shank. But in order that a wood-screw may properly perform its functions, it should not only be turned until the under side of the head is in close contact with the surface of the wood or other article to be held by it, but when it has reached this point, the workman, by additional and sudden pressure upon the screw-driver, will turn the screw still further, and so put a strain or torsion upon it, which, being constant, maintains constant friction on the bearing-surfaces of the screw to prevent it from turning back and relaxing its hold, which, but for such strain or tension, it would do, and thereby loosen the parts of the structure intended to be held firmly together. This tension of the screw when it is subjected to constant jarring and jolting, as in railway cars and other vehicles and machinery, its liability to fracture is greatly increased, and so much so that rivets have, at greatly-increased expense and labor, been largely substituted for screws for fastening in such cases.

To produce a wood-screw which will resist such strain, and adapt it to uses for which the wood-screws heretofore in use are inapplicable, is the chief object sought by our invention.

Among the advantages of this new article are that it has more strength and resistant quality than the best wood-screws heretofore manufactured. A screw of our invention will have greater tensional strength and endurance than the ordinary wood-screw, though smaller and lighter than the latter.

Figure 2:

We would further say—by way of comparing the relative properties of this new article and those before in use, by referring to the annexed drawing making part of this specification, in which Figure 1 represents a one-inch ordinary iron screw, and Fig. 2 a three-quarter-inch wood-screw of our construction—that Fig. 2 is about equal to Fig. 1 in strength and endurance, the quantities of the two being about as 9 to 16. This is not given as the exact proportion.

The improved screw, by the strength and peculiar tenacity of the metal, is not as liable to split or break at the head or shank when subject to the force of the screw-driver as the usual wood-screw, for the reason that the latter, by its seamy and fibrous structure, will split and break under a strain which would not break the new homogeneous screw. A gimlet-pointed homogeneous-steel wood-screw can readily be turned into hard wood without previous boring, which it would be impracticable to turn an iron-gimlet screw into; hence a great amount of labor is saved by the use of this new screw in building railway cars and other structures made of hard woods, while the structure itself is greatly strengthened.

It is known that wire of a fibrous and heterogeneous metal is more compact and less porous at the surface than at the core, while the Bessemer or homogeneous steel wire retains its integrity and uniform character through it diameter and length. A screw made from the first may have a smooth and even surface, but as the surface of the wire is shaved off and the metal cut down by the threading to the porous or laminated core, the structure of the wire is impaired, while the homogeneous steel retains that compact and tenacious nature when it has passed through the process of conversion into wood-screws.

Another advantage is in the manufacture of the improved article. The loss from defective screws does not exceed one-tenth of one per cent., while there is a loss of not less than ten per cent. in the use of other wire heretofore employed, because of the fibrous and seamy nature of the wire, causing breaking, splitting, and cracking of the screw or blank during the process of manufacture, inducing more or less damage to the machinery and tools.

In the manufacture of improved wood-screws we employ machinery ordinarily used for the manufacture of the iron-wire wood-screws for drawing the wire, annealing it, cutting it into blanks, heading, shaving, slotting, threading, &c., and finishing these blanks into complete screws. Therefore, a particular description of such machinery is not required, as it is known in the arts.

The cost of manufacturing our improved article is less or does not exceed that of the ordinary wood-screw.

What we claim as our invention, and desire to secure by Letters Patent, is—

The improvements, herein described, in wood-screws, and in the manufacture of the same—that is to say, the manufacture of wood-screws of Bessemer or homogeneous steel wire jointly with the reduction in weight of metal in said screws as compared with the ordinary iron screws, due to the superior qualities, and for this purpose the superior adaptability, of Bessemer steel, substantially as set forth.

JASON A. BIDWELL.
WILLIAM CHISHOLM.

Witnesses:
JOHN H. BURRIDGE,
W. H. BURRIDGE.